United States Patent [19]
McCulley et al.

[11] Patent Number: 5,276,862
[45] Date of Patent: Jan. 4, 1994

[54] SAFESTORE FRAME IMPLEMENTATION IN A CENTRAL PROCESSOR

[75] Inventors: Lowell D. McCulley; Russell W. Guenthner; Clinton B. Eckard, all of Glendale; Leonard Rabins, Scottsdale; William A. Shelly, Phoenix; Ronald E. Lange, Glendale; David S. Edwards, Phoenix, all of Ariz.

[73] Assignee: Bull HN Information Systems Inc., Billerica, Mass.

[21] Appl. No.: 682,801

[22] Filed: Apr. 9, 1991

[51] Int. Cl.⁵ .............................. G06F 11/00
[52] U.S. Cl. .................. 395/575; 364/285.2; 364/DIG. 1; 371/12; 371/16.5
[58] Field of Search ............ 371/12, 16.1, 16.5; 395/575; 364/285.2

[56] References Cited

U.S. PATENT DOCUMENTS

| | | | |
|---|---|---|---|
| 3,783,256 | 1/1974 | Caputo et al. | 371/12 |
| 3,784,801 | 1/1974 | Caputo et al. | 371/12 |
| 4,697,266 | 9/1987 | Finley | 371/12 |
| 4,703,481 | 10/1987 | Fremont | 371/12 |
| 4,819,154 | 4/1989 | Stiffler | 395/575 |
| 4,853,932 | 8/1989 | Nitschke et al. | 371/12 |
| 4,930,128 | 8/1989 | Suzuki et al. | 371/12 |

Primary Examiner—Charles E. Atkinson
Attorney, Agent, or Firm—J. H. Phillips; J. S. Solakian

[57] ABSTRACT

In order to gather, store temporarily and deliver (if needed) central processor safestore information, a multiphase clock is employed to capture (one full clock cycle behind) the safestore information which typically includes all software visible registers in all (or selected) data manipulation chips of the CPU by routing the safestore information through temporary storage (under the influence of the multiphase clock) in a cache data array and into a special purpose XRAM module. Thus, upon the sensing of a fault, valid safestore information is available in the XRAM for analysis and, if appropriate, resumption of operation at a sequential point just previous to that at which the fault occurred.

5 Claims, 3 Drawing Sheets

SAFESTORE FRAME IMPLEMENTATION IN A CENTRAL PROCESSOR

FIELD OF THE INVENTION

This invention relates to information processing systems and, more particularly, to a feature in a Central Processing Unit (CPU) which facilitates recovery from a fault.

BACKGROUND OF THE INVENTION

In the design of a mainframe CPU, it is highly desirable to provide powerful and reliable error detection and handling features, and this requirement has mandated the provision of various circuits, firmware and software to sense and resolve the diverse types of errors which may occur in operation. When a fault is sensed, it is often necessary to abort an operation in process since the result cannot be trusted. If the fault source is corrected, or if it is determined to have been the result of a transient condition, processing may be resumed, but must do so at a point in the processing operation prior to the operation which resulted in the fault. Thus, it is well known to provide for the temporary storage of a "safestore frame" which contains the essential information necessary to effect a resumption of processing. This essential information typically includes the results of the execution of an ascertainable instruction preceding the fault and may include supplementary information such as the contents of various registers in the processing unit at that time.

In one CPU configuration in which the present invention finds use, certain chips in a Basic Processing Unit (BPU) are provided in master/slave pairs with the results of data manipulation in the BPU being compared for identity. During the data manipulation, safestore information (e.g., the software visible registers in the chips which are active in the current operation) is accessible on master and slave result busses which also serve to supply the execution results from each instruction for comparison to error sensing circuitry. Consequently, there is the opportunity, after the occurrence of a fault and a decision to resume, to return execution to the same or a different CPU at an operation point immediately preceding that at which the fault was sensed.

OBJECTS OF THE INVENTION

It is therefore a broad object of this invention to provide an improved feature for resuming operation in a CPU after a fault has been detected and a decision to resume has been made.

It is a more specific object of this invention to provide improved safestore frame storage by which resumption of operation after a fault has been detected and a decision to resume has been made can be effected at a sequential point just prior to that at which the fault occurred.

SUMMARY OF THE INVENTION

Briefly, these and other objects of the invention are achieved in an exemplary embodiment of the invention by employing a multiphase clock to capture (one full clock cycle behind) safestore information typically including all software visible registers in all BPU chips (or, alternatively, all BPU master chips) by routing the safestore information through temporary storage (under the influence of the multiphase clock) in a cache data array and into a special purpose XRAM module. Thus, upon the sensing of a fault, valid safestore information (e.g., the correct contents of all software visible registers in all BPU chips) is available in the XRAM for analysis and, if appropriate, resumption of operation at a sequential point just previous to that at which the fault occurred.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
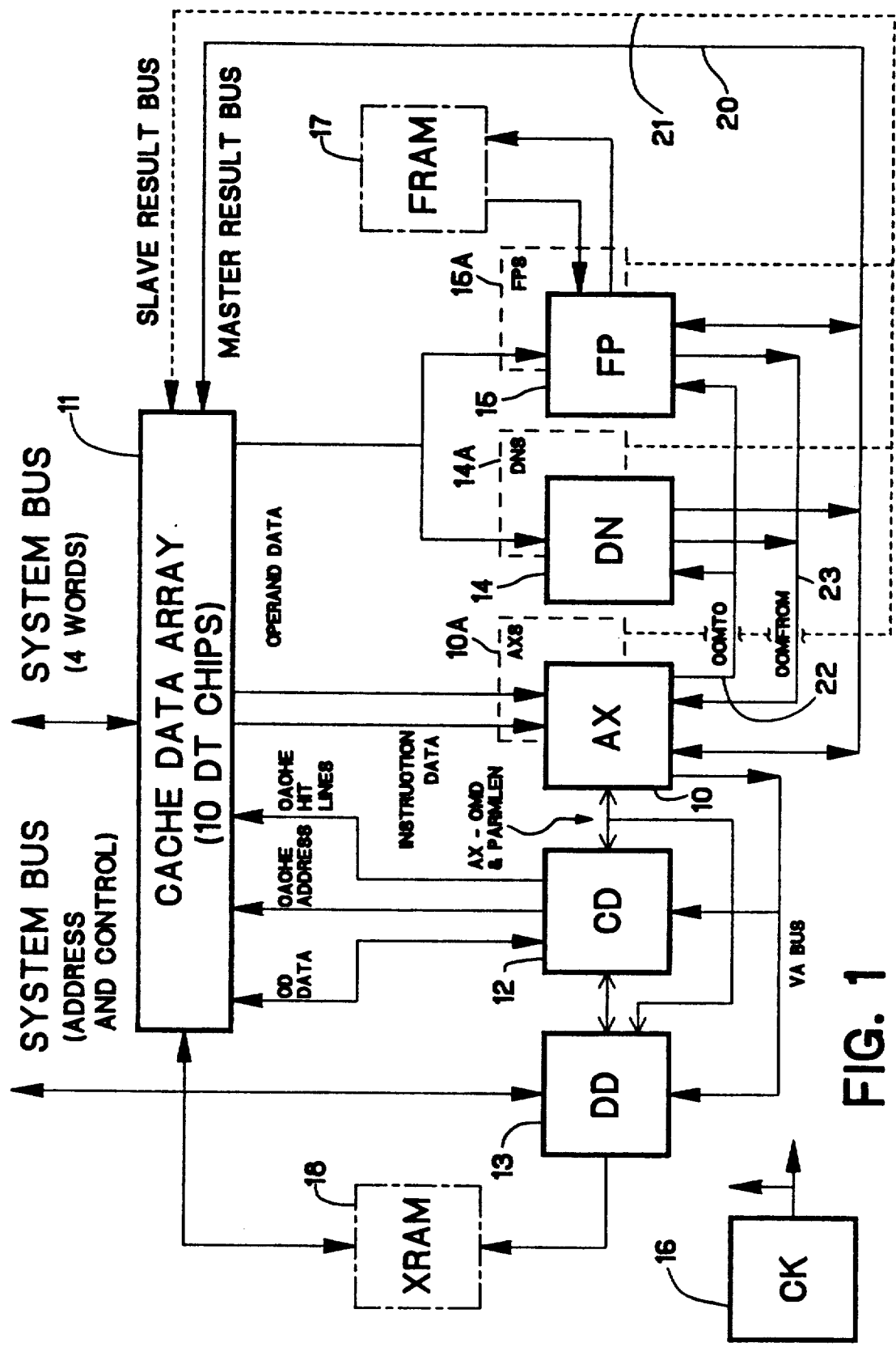
FIG. 1 is a general block diagram of a central processor in which the subject invention may be employed.

Referring first to FIG. 1 which shows an exemplary environment for the invention, the Address and Execution Unit (AX unit) is a microprocessing engine which performs all address preparation and executes all instructions except decimal arithmetic, binary floating point and multiply/divide instructions. Two identical AX chips 10, 10A perform duplicate actions in parallel, and the resulting AX chip outputs are constantly compared to detect errors. The main functions performed by the AX unit include:

effective and virtual address formation;
memory access control;
security checks;
register change/use control;
execution or basic instructions, shift instructions, security instructions, character manipulation and miscellaneous instructions.

The cache unit includes a data part of 64K bytes (16K words) and a set associative directory part which defines the main memory location of each 64-byte (16-word) block stored in the cache data part. Physically, the cache unit is implemented in an array of ten DT chips 11, a cache directory (CD) chip 12 and a duplicate directory (DD) chip 13. Each of the DT, CD and DD chips will be described in more detail below.

The specific functions performed by the DT chip array 11 include:
combined instruction and operand data storage;
instruction and operand buffering and alignment;
data interface with the system bus;
CLIMB safestore file.

Two copies of the cache directory information are respectively maintained in the CD and DD chips which perform different logic functions. The two directory copies allow interrogation of the cache contents from the system bus in parallel and without interference with instruction/operand access from the CPUs and also provide for error recovery.

Functions performed by the CD chip 12 include:
cache directory for CPU accesses;
instruction, operand and store buffer management;
virtual-to-real address translation paging buffer.

Functions performed by the DD chip 13 include:
cache directory for system accesses;
system bus control;
distributed connect/interrupt management;
cache directory error recovery.

Efficient scientific calculation capability is implemented on the Floating Point (FP) chips 15, 15A. The identical FP chips execute all binary floating point arithmetic in duplicate. These chips, operating in concert with the duplicate AX chips 10, 10A, perform scalar or vector scientific processing.

The FP chip 15 (duplicated by the FP chip 15A):
executes all binary and fixed and floating point multiply and divide operations;
computes 12 by 72-bit partial products in one machine cycle;
computes eight quotient bits per divide cycle;
performs modulo 15 residue integrity checks.

Functions performed by the FP chips 15, 15A include:
executes all floating point mantissa arithmetic except multiply and divide;
executes all exponent operations in either binary or hexadecimal format;
preprocesses operands and postprocesses results for multiply and divide instructions;
provides indicator and status control.

Two special purpose random access memories (FRAM 17 and XRAM 18) are incorporated into the CPU. The FRAM chip 17 is an adjunct to the FP chips 15, 15A and functions as an FP control store and decimal integer table lookup. The XRAM chip 18 is an adjunct to the AX chips 10 10A and serves as a scratchpad as well as providing safestore and patch functions.

The CPU also employs a Clock Distribution (CK) chip 16 whose functions include:
clock distribution to the several chips constituting the CPU;
shift path control;
maintenance;
interface between CMU and CPU;
provision of clock stop logic for error detection and recovery.

The DN chip 14 (in parallel with the DN chip 14A) performs the execution of the decimal numeric Extended Instruction Set (EIS) instructions. It also executes the Decimal-to-Binary (DTB), Binary-to-Decimal (BTD) conversion EIS instructions and Move-Numeric-Edit (MVNE) EIS instructions in conjunction with the AX chip 10. The DN chip both receives operands from memory and sends results to memory via the cache unit 11.

The AX, DN and FP chips, collectively, are sometimes referred to as the Basic Processing Unit (BPU). It was previously noted that the AX, DN and FP chips were duplicated with the duplicate units operating in parallel to obtain duplicate results which are available for integrity checking. (The unit pairs are respectively named the AX unit, the DN unit and the FP unit for convenience.) Thus, master and slave results are obtained in the normal operation of these chips. The master results are placed onto a Master Result Bus (MRB) 20 while the slave results are placed onto a Slave Result Bus (SRB) 21. Both the master and slave results are conveyed, on the MRB and SRB respectively, to the cache data array 11 of DT chips. The purposes of this arrangement will be described more fully below. In addition, a COMTO bus 22 and a COMFROM bus 23 couple together the AX unit, the DN unit and the FP unit for certain interrelated operations as will also be described more fully below.

Those skilled in the art will understand that a CPU is subject to the occurrence of numerous errors. While state of the art Very Large Scale Integrated (VLSI) CPU's are very reliable and may run for long periods with no errors whatever occurring, there is little tolerance in many applications for accommodating even occasional errors. As a result, it is necessary to provide many error sensing and recovery circuits throughout the logic of a CPU to detect several types of errors such as parity errors (as a common example) which may occur when information is transferred between elements of the CPU. As previously noted, in the specific CPU chosen for illustration and in which the invention finds particular application, the outputs of duplicate master and slave AX, FP and DN chips are compared for identical results, and the content of the Master and Slave Result Busses are compared in the Cache Unit for similar identity. Various other errors are sensed throughout the CPU.

Figure 2:
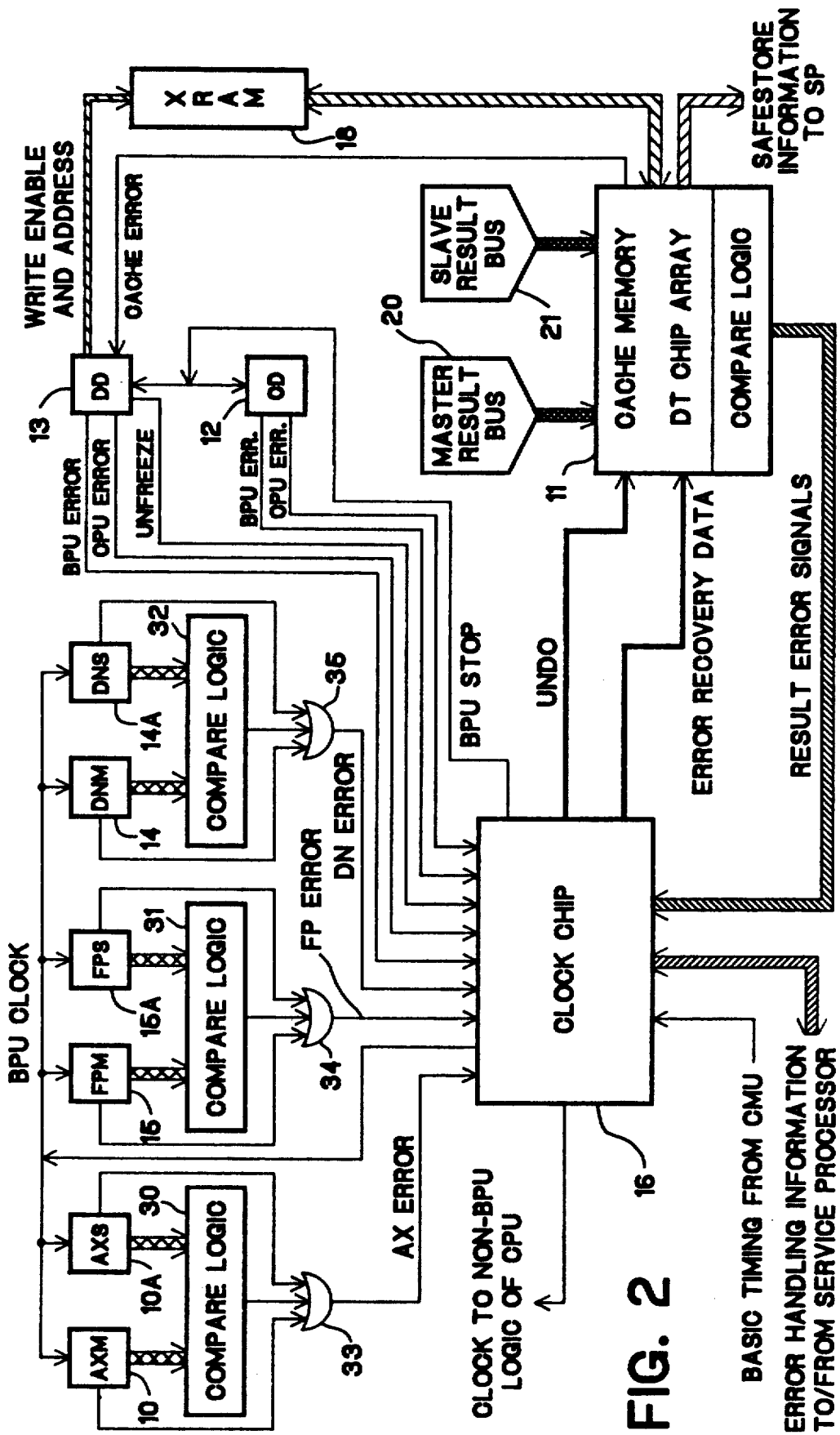
FIG. 2 is a special purpose block diagram of the central processor revealing the error detection and handling aspects of the relationships among the several logic elements.

Attention is now directed to FIG. 2 in which the CPU is shown in a redrawn configuration more specifically oriented to disclose the present invention which is directed to certain aspects of the system facility for recovering from CPU errors. It will be seen that numerous errors are reported to the CK chip 16. The CPU has a variety of sources of internally detected errors which are classified as hardware retryable, software retryable or non-retryable. Hardware retryable errors are those which are directly compensated by the hardware without involvement or intervention by the software operating system and with little or no involvement by an external service processor SP (not shown) to which all errors are reported. Certain paging and cache directory errors, for example, are deemed hardware retryable. For other error conditions, which may be software retryable or non-retryable, the CK chip 16 will either cause a freeze of BPU or CPU clocks as quickly as possible to minimize any loss of data relating to the failing condition or it will invoke a suspension of BPU and system bus operation. Two types of software retry are employed, one corresponding to a freeze and the other to a suspend. If a clock freeze occurs, the machine state is extracted by the SP and provided to the operating system for retry. If a BPU or CPU suspension occurs, the SP may direct a CPU resume, and the operating system will attempt a software retry.

All errors are reported to the SP which scans safestore information and other information to make a preliminary determination regarding the ability of the error-detecting CPU (or another CPU) to attempt a retry. Retry conditions are further evaluated by the operating system, and the actual software retry is done by execution on one of the CPUs.

Each of the AX chips 10, 10A, FP chips 15, 15A and DN chips 14, 14A combine multiple error signal lines (as represented by OR-gates 33, 34, 35), including those from the individual unit compare logic blocks 30, 31, 32, to obtain AX, FP and DN ERROR signals which are applied to the CK chip 16. The majority of the checked logic areas sense parity errors during data transfers, but other error types, such as directory read mismatch, DIR Level In/Out miscompares, illegal command sequence, increment miscount, multiple directory hit, etc. as well as several types of compares are all monitored. The CD chip 12 and DD chip 13 each send separate BPU error and CPU error signals to the CK chip.

AX errors, DN errors, FP errors and result bus errors are all deemed to be BPU errors. However, the CD chip 12 and the DD chip 13 can detect and advise the CK chip 16 of either BPU errors or CPU errors (for example, cache errors) which are treated differently. In addition, the CD and DD chips are notified of BPU errors originating elsewhere, and, under certain conditions (such as during a hardware/firmware troubleshooting process), the DD chip 13 may order a temporary "unfreeze" of the BPU clock. Certain cache errors are reported directly to the DD chip 13 which then determines if a BPU or CPU error signal is to be forwarded to the CK chip 16.

While the compare logic blocks 30, 31, 32, are shown separately from the several master/slave chip pairs, this function may advantageously be implemented into the chips themselves and activated in the slave chips as more completely described in copending U.S. patent application Ser. No. 07/594,880 entitled "Error Detection in the Basic Processing Unit of a VLSI Central Processor", filed Oct. 9, 1990, by R. W. Guenthner, C. B. Eckard, L. Rabins, W. A. Shelly, R. E. Lange, D. S. Edwards and B. E. Flocken and assigned to the assignee of the present invention.

Figure 3:
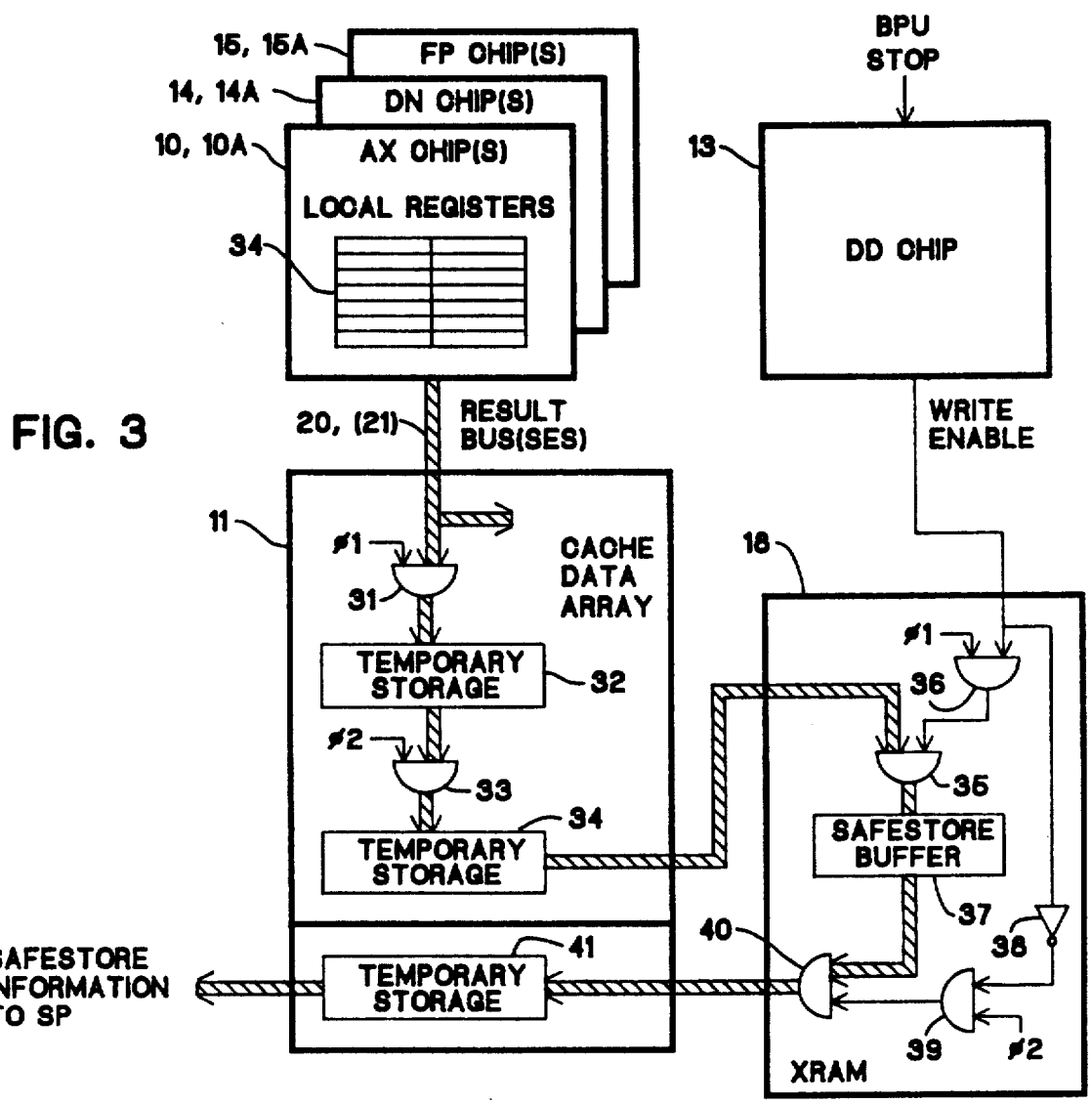
FIG. 3 is a block diagram of essential elements of the central processor pertaining to the subject invention.

Attention is now directed to FIG. 3 in which certain details of the subject invention are shown. As previously noted, the master and slave result busses 20, 21 convey the results of data manipulations performed in the AX chips 10, 10A, DN chips 14, 14A and FP chips 15, 15A to the cache data array 11 for comparison and, if appropriate, storage. Thus, information is available on the result busses which can be employed to build a safestore frame which can optionally include information from the master chips only or both the master and slave chips. However, the validity of the safestore information must be guaranteed, and this task is cooperatively performed by the cache data array 11, the DD chip 13 and the XRAM 18.

Figure 4:
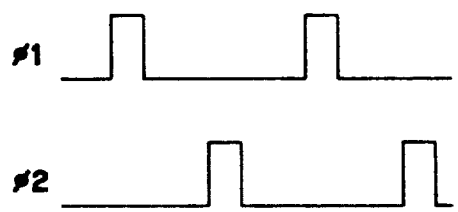
FIG. 4 is a diagram illustrating the relationship between the clock pulses of a system employing a multiphase clock.

Referring briefly to FIG. 4, typical multiphase clock signals are shown and include alternating, non-overlapping $\phi 1$ and $\phi 2$ clock pulse streams. As will become more apparent below, the $\phi 1$ and $\phi 2$ clock pulses are used to advantage in the invention. Referring again to FIG. 3, the safestore information available from the result busses at a given operation point is applied to an AND-gate array 31 (in the cache data array 11) which is fully enabled by the $\phi 1$ clock pulse to load the safestore information into temporary storage block 32. Subsequently, the safestore information is clocked from temporary storage block 32 into temporary storage block 34 via AND-gate array 33 which is fully enabled by clock pulse $\phi 2$.

The outputs of temporary storage block 34 are coupled to the inputs of AND-gate array 35 in the XRAM 18. AND-gate array 35 is enabled or disabled by the output from AND-gate 36 which is driven by the "write enable" output from the DD chip and by clock pulse $\phi 1$. In the example, the "write enable" signal is always logic "1" during normal operation such that the information in temporary storage block 34 in the cache data array 11 is transferred to the safestore buffer 37 at $\phi 1$.

Thus, the safestore information clocked into the safestore buffer is valid for the end of the immediately preceding data manipulation operation to that which has just been completed by the AX, DN and/or FP chips.

In the event that an error causing a BPU stop is sensed, the "write enable" signal switches to a logic "0" which inhibits updating the safestore buffer 37 with possibly invalid information. However, the "write enable" signal is inverted by inverter 38 which drives one input to an AND-gate 39 driven by $\phi 2$ such that AND-gate 39 is fully enabled just after the error is sensed. AND gate 39 drives the enabling input of AND-gate array 40 which serves to transfer the contents of the safestore buffer 37 to another temporary storage block 41 which may advantageously, but not necessarily, be incorporated into the cache data array 11. The valid safestore information thus placed into temporary storage block 41 may then be promptly transferred to the external service processor for analysis and possible return to the faulting CPU o another CPU in order that resumption (if undertaken) may be achieved at the earliest possible operation point.

Those skilled in the art will also appreciate that, as the limits of integration are pushed, an entire CPU employing the features of the present invention may be soon realized on a single chip, and the fact that the described embodiment is implemented among several VLSI chips is not intended to be a limitation on the invention.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a central processor including:

A) data manipulation means for performing successive data manipulation operations and for making safestore information available at the conclusion of each data manipulation operation;

B) a result bus coupled to receive safestore information from said data manipulation means;

C) a cache data array;

D) clock means for generating a multiple phase clock including alternating, non-overlapping $\phi 1$ and $\phi 2$ clock pulse streams; and E) error sensing means for sensing the presence of an error in said central processor and for issuing an error signal indicative thereof;

safestore information gathering, storage and delivery means comprising:

F) first temporary storage means situated in said cache data array;

G) first transfer means for transferring safestore information means available from said result bus into said first temporary storage means upon the occurrence of a first $\phi 1$ pulse;

H) second transfer means situated in said cache data array;

I) second transfer means for transferring safestore information from said first temporary storage means into said second temporary storage means upon the occurrence of a first $\phi 2$ pulse;

J) an XRAM;

K) third temporary storage means situated in said XRAM;

L) third transfer means for transferring safestore information from said second temporary storage means into said third temporary storage means upon the occurrence of a second $\phi 1$ pulse which is later in time than said first $\phi 1$ pulse; and M) inhibiting means responsive to said error signal to disable said third transfer means;

whereby, if an error is sensed, safestore information stored in said third temporary storage means may be accessed for analysis and potential resumption at an operation point immediately preceding that at which an error was sensed.

2. The central processor of claim 1 which further includes:

A) fourth temporary storage means; and

B) fourth transfer means for transferring safestore information from said third temporary storage means into said fourth temporary storage means subsequent to disablement by said inhibiting means of said third transfer means.

3. The central processor of claim 3 in which said fourth temporary storage means is situated in said cache data.

4. The central processor of claim 2 in which said fourth transfer means is fully enabled by a second $\phi 2$ pulse which is later in time than said first $\phi 2$ pulse.

5. The central processor of claim 3 in which said fourth transfer means is sully enabled by a second $\phi 2$ pulse which is later in time than said first $\phi 2$ pulse.

* * * * *